Sept. 1, 1959 D. C. ERDMAN 2,902,658
APPARATUS FOR GENERATING FREQUENCY MODULATED SIGNALS
Filed May 1, 1957 2 Sheets-Sheet 2
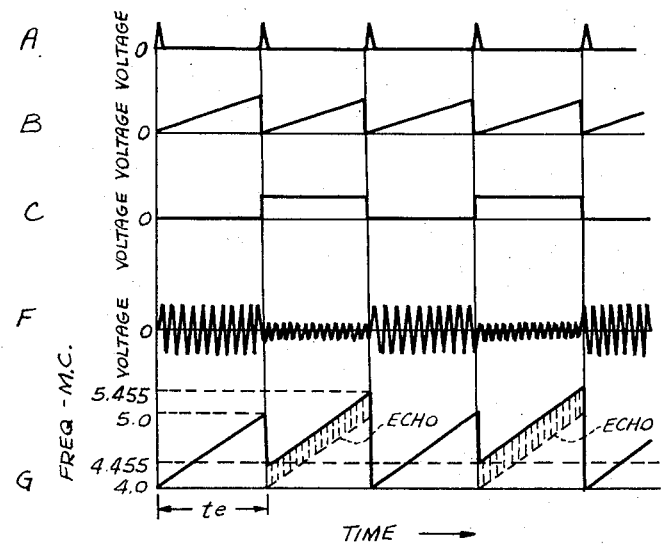
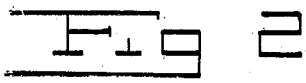
INVENTOR.
DONALD C. ERDMAN
BY
ATTORNEY

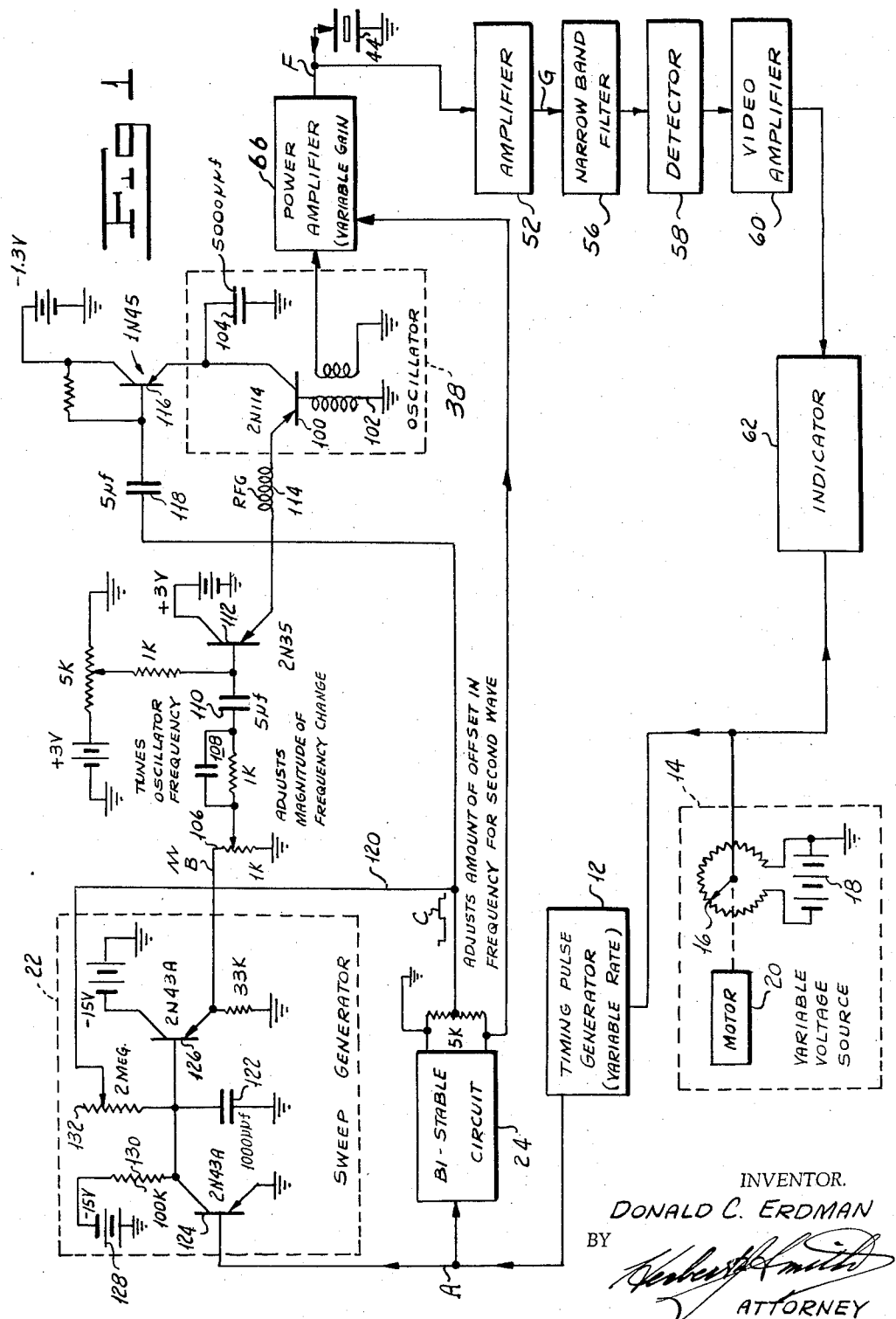

United States Patent Office 2,902,658
Patented Sept. 1, 1959

2,902,658

APPARATUS FOR GENERATING FREQUENCY MODULATED SIGNALS

Donald C. Erdman, Pasadena, Calif., assignor to Electrocircuits Incorporated, Pasadena, Calif., a corporation of California Application May 1, 1957, Serial No. 656,332

6 Claims. (Cl. 332—16)

This invention relates to improved apparatus for generating frequency modulated signals for use in measuring the propagation time of waves along a path. The invention has particular reference to use in producing ultrasonic waves such as are employed in the nondestructive testing of materials to detect hidden flaws.

In accordance with the invention which is disclosed in copending application Serial No. 522,542, for "Methods and Apparatus for Measuring Wave Propagation Time," the inventor and assignee of said copending application being the same as in the instant application, improved apparatus is disclosed for measuring wave propagation time by the use of frequency modulated signals. In accordance with the invention which is disclosed in the aforesaid copending patent application, two waves are produced in time sequence having frequencies which vary or sweep periodically in substantially the same manner, with the second wave starting at a later time and being offset in frequency from that of the first wave. One or both of the waves may be transmitted from the source to a reflecting target, and the reflected waves are mixed with one or both of the waves which are then being produced by the source. An indicator arrangement provides an indication of the occurrence of heterodyne signals having a certain frequency.

The present invention relates to an improved arrangement for generating two waves in time sequence having frequencies which vary or sweep periodically in substantially the same manner. The present invention discloses a greatly simplified arrangement for producing such waves.

In accordance with the present invention, a transistor oscillator circuit is arranged in the form of a negative resistance oscillator. A signal of saw-tooth wave form is applied to one electrode of the transistor oscillator to cause the frequency of oscillation of the circuit to sweep through a predetermined frequency range in response to each excursion of the saw-tooth signal. A signal of square wave form is applied to another electrode of the transistor and it limits the current which flows through the transistor in accordance with the square wave form of the signal so as to cause the frequency of oscillation to change from one level to another level in accordance with each change in level of the signal of square wave form. The signal of saw-tooth wave form and the signal of square wave form are caused to occur in synchronism. Due to the action of the signal of square wave form, the frequency of oscillations sweeps through two frequency ranges, with the lowest frequency range occurring during the periods of time when the saw-tooth wave form is of minimum amplitude and with the sweep of higher frequency range occurring when the square wave signal is of maximum amplitude. Thus, two waves are provided in time sequence having frequencies which sweep periodically in substantially the same manner, with the second wave being offset in frequency from that of the first wave.

In some instances the sweep in frequency of the two waves is not identical, and it is desirable to correct for any differences in the two sweeps. This may be done in accordance with the present invention by changing the amplitudes of the successive saw-tooth signals in accordance with the square wave signal. This may be done by providing a simple coupling between the source which produces the square wave signals and the sweep generator which produces the saw-tooth signals.

One of the advantages of the invention is to provide a novel oscillator circuit which may be employed in nondestructive testing of materials.

Another advantage of the present invention is to provide a novel improved oscillator arrangement for generating the frequency modulated waves employed in ultrasonic apparatus.

Another advantage of the invention is the provision of an oscillator circuit having a correction arrangement for correcting differences or non-linearities in the frequency modulated signals which are produced by the oscillator circuit and usable in ultrasonic apparatus.

The present invention contemplates apparatus for measuring wave propagation time by using frequency modulated signals wherein two waves produced in time sequence vary periodically, with one wave starting at a later time and being offset in frequency from the other. One or more of the waves are transmitted to a reflecting target and the reflected wave is mixed with one or more of the waves which are then produced by the source and present an indication of target information on an indicator represented by the occurrence of heterodyne signals having a certain frequency. The improved oscillator arrangement includes transistors and tuning networks for attaining the desired results.

The foregoing and other objects and advantages of the invention will appear more fully hereinafter from a consideration of the detailed description which follows, taken together with the accompanying sheets of drawing wherein several embodiments of the invention are illustrated by way of example. It is to be expressly understood, however, that the drawings are for the purpose of illustration and description only and are not intended as a definition of the limits of the invention.

In the drawings:

Fig. 1 is a circuit diagram partially in block form and partially in schematic form, showing the present invention employed in ultrasonic apparatus.

Fig. 2 illustrates the wave forms of various signals which are produced in the apparatus of Fig. 1.

Referring to the drawings, and more particularly to Fig. 1, there is shown a time pulse generator 12, which provides a series of equally spaced pulses A (see wave forms in Fig. 2) which control the sequence of operations in the apparatus. The timing pulse generator is a variable repetition rate type and the rate or periodicity of the pulses is controlled by the voltage which is produced by variable voltage source 14. The variable voltage source 14 may comprise a potentiometer 16 which is connected across a source of potential 18 and which is driven by a motor 20, or it may be a conventional electronic sweep generator which provides periodic voltage excursions.

The timing pulses A are applied to a sweep generator 22 and to a bi-stable circuit 24. The sweep generator produces voltage excursions B (see Fig. 2) having saw-tooth wave form in synchronism with the timing pulses A. The bi-stable circuit produces signals C (see Fig. 2) of rectangular wave form in synchronism with the voltage excursions B.

The saw-tooth signals B are applied to a circuit arrangement including a potentiometer 106 connected through means for tuning the oscillator frequency and a transistor arrangement which is connected to oscillator 38. The output of the oscillator 38 is connected to a power amplifier 66 which is a variable gain so that a signal having the general wave form of F (Fig. 2) is connected to a crystal or other transducer 44, which serves to transmit and receive ultrasonic signals, with said crystal being connected to ground in the conventional manner as shown by symbol. As illustrated in the wave form F of Fig. 2, the amplitude of the signal which is conveyed through the power amplifier 66 is reduced during alternate cycles of operation, and the wave of reduced amplitude is mixed with the echo signals in the amplifier 52 to provide heterodyne signals.

In conventional practice, the transducer has a portion thereof immersed in liquid which serves to convey the ultrasonic waves with much greater efficiency than would be possible in the air. The output of the power amplifier 66 is fed into transducer 44 and simultaneously into the amplifier 52. The echo signals which are received by the transducer 44 are also fed into the amplifier 52. The output of the amplifier 52 has a wave form G (see Fig. 2) which is fed through a narrow band filter 56, thence through a detector 58, and a video amplifier 60.

The narrow band filter 56 may be arranged to pass heterodyne signals having any desired frequency. By way of example, the filter 56 may be tuned to pass signals having a frequency of 455 kilocycles. Such filters are readily available because they are conventional types.

The detected signal is amplified by a video amplifier 60 and applied to one set of the deflection plates of a conventional cathode-ray tube represented as an indicator 62. The variable voltage which is produced by the source 14 is applied to the other set of the deflection plates of the cathode-ray tube or indicator 62. Such a deflection arrangement provides an A-type scan so that the location of the detected signal along the horizontal axis of the cathode-ray tube provides a measure of the distance to the target.

The distance to the target is also indicated by the time between the pulses which are produced by the timing pulse generator at the instant when a signal appears on the screen of the cathode-ray tube. If desired, the signal which is produced by the variable voltage source 14 may be adjusted manually and the distance to the target may be ascertained by observing the manual setting of the voltage source when a signal is produced on the screen of the cathode-ray tube. However, it is preferable that the signal which is produced by the source 14 be varied cyclically, as indicated in Fig. 1, so that plural reflecting surfaces may be indicated during each cycle of operation.

The oscillator circuit comprises a transistor 100 and a resonant circuit 102 which are arranged in the form of a negative resistance oscillator. The transistor 100 should be a type having an alpha characteristic which is greater than 1 in order to produce the desired negative resistance characteristic. A condenser 104 is connected between the collector electrode and the grounded terminal of the resonant circuit 102, and this condenser provides a very low impedance path for the radio frequency energy so that the resonant circuit 102 is effectively coupled between the base and the collector electrodes of the transistor.

The sweep signals B which are produced by the sweep generator are applied through a potentiometer 106 and a wave shape network 108 and a coupling condenser 110 to the base electrode of a transistor 112. The transistor 112 serves as an emitter follower circuit, and it serves as a low impedance circuit for controlling the signal which is applied to the emitter electrode of the oscillator transistor 100.

The saw-tooth signals B are applied through the low impedance circuit of the transistor 112 and a radio frequency coil 114 to the emitter electrode of the transistor 100. The saw-tooth signals cause the frequency of oscillation of the oscillator circuit to sweep through a predetermined frequency range in response to each excursion of the saw-tooth signal.

A transistor 116 serves as a low impedance circuit for limiting the current which flows through the collector electrode of the oscillator transistor 100. The transistor 116 has its base electrode coupled through a coupling condenser 118 to receive the signals C of square wave form which are produced by the bi-stable circuit. Thus, the current which flows through the emitter circuit of the transistor 100 is limited in accordance with the wave form of the square wave signals C, and this causes the frequency of oscillation of the oscillator to change from one level to another level in accordance with each change in level of the signal of square wave form.

These changes in level are synchronized with the sawtooth signals so that the oscillator repeatedly produces two waves in time sequence having frequencies which sweep periodically in substantially the same manner, with the second wave being offset in frequency from that of the first wave.

Any differences in the two sweeps in frequency range may be corrected by a signal applied through the lead 120 to the sweep generator. The lead 120 is connected to receive the square wave signals C which are produced by the bi-stable circuit, and these signals are applied to the sweep generator to alter the charging current of a condenser 122 in the sweep generator in accordance with the wave form of the square wave signal.

The sweep generator comprises a switching transistor 124 and a follower transistor 126. The switching transistor 124 controls the charging and discharging of the condenser 122 from the source of potential 128 through the resistor 130 so as to produce signals of saw-tooth wave form.

Every other saw-tooth signal may be altered by the square wave signals C which are applied through the lead 120 and a potentiometer 132 to the condenser 122.

The resulting saw-tooth signals are applied through the follower transistor 126 to provide the output signals B from the final transistor of the sweep generator.

From the foregoing it will be seen that the present invention embraces two species of an improved oscillator arrangement for generating the frequency modulated waves employed in the ultrasonic apparatus. The first species of the invention relates to the oscillator circuit itself. The second species concerns the oscillator circuit plus a correction arrangement for correcting for any differences or non-linearities of the frequency modulated signals which are produced by the oscillator circuit.

While several embodiments of the invention have been illustrated and described in detail, it is to be expressly understood that invention is not limited thereto. Various changes can be made in the design and arrangement of the parts without departing from the spirit and scope of the invention as will now be understood by those skilled in the art.

What is claimed is:

1. In an apparatus for generating frequency modulated signals for measuring the propagation time of waves travelling along a preselected path, in combination, first generating means for generating a first signal having a first wave form; second generating means for generating a second signal having a second wave form; oscillator means for producing an oscillatory signal and having respectively a first and second input circuit and an output circuit, said first and second input circuits being connected respectively to said first and second generating means so that said first and second signals are respectively applied thereto and mixed together with said oscillatory signal to modulate the same and produce a first series of alternate modulated wave trains, one of said wave trains being modulated in accordance with a first preselected combination of said first and second signals and the other of said wave trains in said series being modulated in accordance with a second preselected combination of said first and second signals; and mixing means having a first input connected to said output circuit of said oscillator means for receiving said series of alternate wave trains and having a second input connected to said second generating means for receiving said second signal thereof, said mixing means mixing the signals applied thereto to produce a second series of alternate modulated wave trains wherein the amplitude of one of said second series of wave trains is larger than the amplitude of the other of said second series of wave trains.

2. Apparatus as claimed in claim 1 wherein said first and second generating means are synchronized by synchronizing means so that said first and second signals have a pre-selected phase relationship therebetween.

3. In an apparatus for generating frequency modulated signals for measuring the propagation time of waves travelling along a preselected path, in combination, first generating means for generating a sawtooth signal; second generating means for generating a square wave signal; oscillator means for producing an oscillatory signal and having respectively a first and second input circuit and an output circuit, said first and second input circuits being connected respectively to said first and second generating means so that said sawtooth and square wave signals are respectively applied thereto and mixed together with said oscillatory signal to modulate the same and produce a first series of alternate modulated wave trains, one of said wave trains being modulated in accordance with a first preselected combination of said sawtooth and square wave signals and the other of said wave trains in said series being modulated in accordance with a second preselected combination of said sawtooth and square wave signals; and mixing means having a first input connected to said output circuit of said oscillator means for receiving said series of alternate wave trains and having a second input connected to said second generating means for receiving said square wave signal thereof, said mixing means mixing the signals applied thereto to produce a second series of alternate modulated wave trains wherein the amplitude of one of said second series of wave trains is larger than the amplitude of the other of said second series of wave trains.

4. In an apparatus for generating frequency modulated signals for measuring the propagation time of waves travelling along a preselected path, in combination, first generating means for generating a first signal having a first wave form; second generating means for generating a second signal having a second wave form; oscillator means for producing an oscillatory signal and having respectively a first and second input circuit and an output circuit, said first and second input circuits being connected respectively to said first and second generating means so that said first and second signals are respectively applied thereto and mixed together with said oscillatory signal to modulate the same and produce a first series of alternate modulated wave trains, one of said wave trains being modulated in accordance with the sum of said first and second signals and the other of said wave trains in said series being modulated in accordance with the difference between said first and second signals; and mixing means having a first input connected to said output circuit of said oscillator means for receiving said series of alternate wave trains and having a second input connected to said second generating means for receiving said second signal thereof, said mixing means mixing the signals applied thereto to produce a second series of alternate modulated wave trains wherein the amplitude of one of said second series of wave trains is larger than the amplitude of the other of said second series of wave trains.

5. In an apparatus for generating frequency modulated signals for measuring the propagation time of waves travelling along a preselected path, in combination, first generating means for generating a sawtooth signal; second generating means for generating a square wave signal; oscillator means for producing an oscillatory signal and having respectively a first and second input circuit and an output circuit, said first and second input circuits being connected respectively to said first and second generating means so that said sawtooth and square wave signals are respectively applied thereto and mixed together with said oscillatory signal to modulate the same and produce a first series of alternate modulated wave trains, one of said wave trains being modulated in accordance with the sum of said sawtooth and square wave signals and the other of said wave trains in said series being modulated in accordance with the difference between said sawtooth and square wave signals; and mixing means having a first input connected to said output circuit of said oscillator means for receiving said series of alternate wave trains and having a second input connected to said second generating means for receiving said square wave signal thereof, said mixing means mixing the signals applied thereto to produce a second series of alternate modulated wave trains wherein the amplitude of one of said second series of wave trains is larger than the amplitude of the other of said second series of wave trains.

6. Apparatus as claimed in claim 5 wherein said first and second generating means are synchronized by synchronizing means so that said first and second signals have a preselected phase relationship therebetween.

References Cited in the file of this patent

UNITED STATES PATENTS

| | | |
|---|---|---|
| 2,312,203 | Wallace | Feb. 23, 1943 |
| 2,502,295 | Wallace | Mar. 28, 1950 |
| 2,663,800 | Herzog | Dec. 22, 1953 |